United States Patent
Bates et al.

(10) Patent No.: US 8,274,874 B2
(45) Date of Patent: Sep. 25, 2012

(54) APPARATUS, SYSTEM, AND METHOD FOR LOCATING AND FAST-SEARCHING UNITS OF DIGITAL INFORMATION IN VOLUME, OPTICAL-STORAGE DISKS

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/025,682

(22) Filed: Feb. 4, 2008

(65) Prior Publication Data
US 2009/0196139 A1 Aug. 6, 2009

(51) Int. Cl.
*G11B 7/00* (2006.01)
*H04N 5/89* (2006.01)

(52) U.S. Cl. ........... 369/103; 369/94; 386/336; 386/329

(58) Field of Classification Search .......... 369/100, 369/103, 94; 386/329, 336, 353, 342, 361
See application file for complete search history.

(56) References Cited

U.S. PATENT DOCUMENTS

| | | | | |
|---|---|---|---|---|
| 5,164,831 A * | 11/1992 | Kuchta et al. | ............. | 348/231.7 |
| 5,608,715 A * | 3/1997 | Yokogawa et al. | ........ | 369/275.1 |
| 5,745,645 A * | 4/1998 | Nakamura et al. | ............ | 386/131 |
| 5,838,653 A * | 11/1998 | Fan et al. | ................... | 369/275.1 |
| 5,914,926 A * | 6/1999 | Maeno et al. | ............... | 369/53.35 |
| 5,917,798 A | 6/1999 | Horimai et al. | ................ | 369/103 |
| 5,978,542 A * | 11/1999 | Ting et al. | ........................ | 386/68 |
| 6,072,759 A * | 6/2000 | Maeda et al. | ............... | 369/59.25 |
| 6,424,614 B1 * | 7/2002 | Kawamura et al. | ........ | 369/275.3 |
| 6,426,812 B2 * | 7/2002 | Ichikawa et al. | ................ | 359/22 |
| 6,540,397 B2 * | 4/2003 | Yoshinari et al. | ............. | 368/286 |
| 6,876,612 B2 * | 4/2005 | Yoneyama et al. | ........ | 369/47.55 |
| 6,944,100 B2 * | 9/2005 | Sakamoto et al. | ......... | 369/13.08 |
| 7,158,274 B2 | 1/2007 | Kim | ............................... | 359/32 |

(Continued)

FOREIGN PATENT DOCUMENTS

JP 2001-111963 * 4/2001

(Continued)

OTHER PUBLICATIONS

MAT (machine assisted translation) in englisht of JP 2001-111963.*

*Primary Examiner* — Thang Tran
(74) *Attorney, Agent, or Firm* — Kunzler Law Group, pc

(57) ABSTRACT

An apparatus, system, and method are disclosed to locate a group of units of digital information in a volume, optical-storage disk. The apparatus includes a first optical recording layer, a second optical recording layer, and an optical disk reading sled. The first optical recording layer stores a first group of units of digital information in a distinct region of the optical disk. The second optical recording layer stores a first locator for the first group of units of digital information in substantially the same distinct region of the optical disk. A first laser in the optical disk reading sled reads the first locator stored in the second optical recording layer, which indicates the contents of the units of digital information stored in the first optical recording layer being read by a second laser, also in the optical disk reading sled.

18 Claims, 7 Drawing Sheets

U.S. PATENT DOCUMENTS

| | | | |
|---|---|---|---|
| 7,420,902 B2 * | 9/2008 | Blacquiere | 369/53.17 |
| 7,428,205 B2 * | 9/2008 | Harding | 369/103 |
| 7,689,106 B2 * | 3/2010 | Ono et al. | 386/131 |
| 7,859,971 B2 * | 12/2010 | Bates et al. | 369/103 |
| 7,903,525 B2 * | 3/2011 | Koda et al. | 369/103 |
| 2001/0017978 A1 * | 8/2001 | Nagasawa | 386/126 |
| 2004/0252832 A1 | 12/2004 | Domjan et al. | 380/200 |
| 2005/0100093 A1 * | 5/2005 | Holcomb | 375/240.12 |
| 2005/0231777 A1 | 10/2005 | Curtis | 359/35 |
| 2006/0136958 A1 | 6/2006 | LeBlanc, III et al. | 720/719 |
| 2006/0158988 A1 * | 7/2006 | Uchida | 369/103 |
| 2006/0181999 A1 | 8/2006 | Knittel et al. | 369/103 |
| 2006/0250904 A1 | 11/2006 | Tsumagari et al. | 369/1 |
| 2007/0054195 A1 * | 3/2007 | Usami | 430/2 |
| 2007/0147794 A1 * | 6/2007 | Araki | 386/125 |
| 2008/0196050 A1 * | 8/2008 | Bates et al. | 720/718 |
| 2008/0256566 A1 * | 10/2008 | Bates et al. | 720/718 |
| 2009/0262628 A1 * | 10/2009 | Koda et al. | 369/103 |

FOREIGN PATENT DOCUMENTS

WO    WO 2007/049577    *    5/2007

* cited by examiner

APPARATUS, SYSTEM, AND METHOD FOR LOCATING AND FAST-SEARCHING UNITS OF DIGITAL INFORMATION IN VOLUME, OPTICAL-STORAGE DISKS

BACKGROUND OF THE INVENTION

1. Field of the Invention

This invention relates to volume, optical-storage disks and more particularly relates to locating and fast-searching units of digital information in volume, optical-storage disks.

2. Description of the Related Art

Optical storage disks are cheap, portable, and capable of storing large amounts of data. Overtime, developers have been able to encode more and more information on the surface of optical storage disks by focusing the lasers that read them to an ever narrower point, as demonstrated by the progression from Compact Disks, to DVDs, to HD-DVDs and BLU-RAY® disks. Physical limits on the ability of lasers to undergo further focusing, however, will prevent large increases in the amount of data that can be encoded on the surface of optical disks.

Nevertheless, current DVD technology is able to encode enough information to store video and provides a high level of performance in locating video data. Video is stored as picture image frames, with about 30 frames for each second of video. Typically, image frames come in groups of about 15. Often each group includes an anchor frame that contains a complete image and about 14 frames that only provide information about changes to the original anchor frame. Since change frames only provide information about changes to an anchor frame, they cannot be viewed independent of the anchor frames.

Anchor frames stored on the surface of a rotating DVD, can be accessed quickly. These anchor frames provide a descriptive context for the information provided in each associated change frame. Anchor frames, therefore, provide a directory of video information that can quickly be reviewed to locate video data quickly.

Performance in locating data will become an issue for new technologies that will sidestep the storage limitations imposed on optical-storage disks by the physical limits on the ability of lasers to undergo further focusing. Such technologies will allow for the encoding of data in the volume of optical disks, not just on their surfaces. These types of technologies will allow optical disks to store terabytes of information, as opposed to the few tens of gigabytes that the most advanced HD-DVDs and BLU-RAY® disks are currently capable of storing. As appreciated, the ability to encode and store such vast amounts of data, makes performance in locating units of digital information an important issue.

From the foregoing discussion, it should be apparent that a need exists for an apparatus, system, and method for improving the performance, in terms of data location, of volume, optical disks that are able to store tremendous amounts of data in their volume. Preferably, the apparatus, system, and method would provide a directory that can quickly be reviewed to provide contextual information used to describe or define groups of units of digital information, similar to the anchor frames currently employed with DVDs.

SUMMARY OF THE INVENTION

The present invention has been developed in response to the present state of the art and, in particular, in response to the problems and needs in the art that have not yet been fully solved by currently available approaches to locate units of digital information within volume, optical storage-disks. Accordingly, the present invention has been developed to provide an apparatus, system, and method to locate digital information within a volume, optical storage-disk by providing a directory of locators that provide the context necessary to locate groups of units of digital information, thereby meeting the need in the art as discussed above.

An apparatus to locate a group of units of digital information in a volume, optical-storage disk is provided with a receiving tray, a first laser, a second laser, a processing module, and an optical disk reading sled. The receiving tray is configured to house a removable optical disk. The first laser reads information from a first locator stored in the first optical recording layer of a removable optical disk at a particular region of the removable optical disk. The second laser reads a first group of units of digital information stored in a second optical recording layer of the removable optical disk at the particular region. The processing module receives the information read by the first laser and by the second laser and processes the information. The optical disk reading sled carries the first laser and the second lasers as it seeks in a radial direction across the removable optical disk.

The apparatus is configured to locate the first group of units of digital information. Once the first laser reads the first locator, the second laser is in the region to read the first group of units of digital information. The first locator describes, defines, or provides context for the contents of the first group of units of digital information. In this manner, the first group of units of digital information is located.

A system of the present invention is also presented to locate a group of video picture frames in an optical disk. The system includes elements similar to those of the apparatus above, except that they involve video picture frames in the place of units of digital information. Similar elements include a first group of video picture frames stored in a first optical recording layer in a distinct region of an optical disk. They also include the elements of a first locator video picture frame substantially similar to a video picture frame from the first group of video picture frames stored in a second optical recording layer in substantially the same distinct region of the optical disk as the first group of video picture frames. Additionally, the similar elements include a first laser capable of receiving signals from the first locator video picture and a second laser capable of receiving signals for the first group of video picture frames, the first and second lasers being disposed adjacent to one another in an optical disk reading sled.

In addition to elements similar to those appearing in the apparatus above, the system includes a dichroic layer disposed between the first optical recording layer and the second optical recording layer that allows light from the first laser to pass through to the second optical recording layer, but reflects light from the second laser. The system also includes a computer capable of processing signals from both the first laser and the second laser to render video picture frames on a display. The system further includes a control sub-system capable of varying the speed of the optical reading sled and selecting between video picture frames from the first optical recording layer and the second optical recording layer for display.

A user may employ the control sub-system to riffle through video picture frames from the second optical recording layer as those video picture frames are presented on the display. By means of a selected video picture frame from the second optical recording layer, a user may select an entire associated group of associated video picture frames stored in the same region of the optical disk in the first optical recording layer.

A method of the present invention is also presented for locating a group of video picture frames in an optical disk. The method in the disclosed embodiments substantially includes the steps necessary to carry out the functions presented above with respect to the operation of the described apparatus and system. In one embodiment, the method includes reading a series of locator video picture frames in a first optical recording layer of an optical disk, each locator video picture frame being stored in a distinct region of the optical disk. The method also includes, displaying the series of locator video picture frames and selecting a particular locator video picture frame from the series of displayed locator video picture frames. Additionally, the method includes accessing a particular group of video picture frames stored in a second optical recording layer in the same region of the optical disk in which the particular selected video picture frame is stored.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not, therefore, to be considered to be limiting of its scope, the invention will be described and explained with additional specificity and detail through the use of the accompanying drawings, in which.

DETAILED DESCRIPTION OF THE INVENTION

Figure 1:
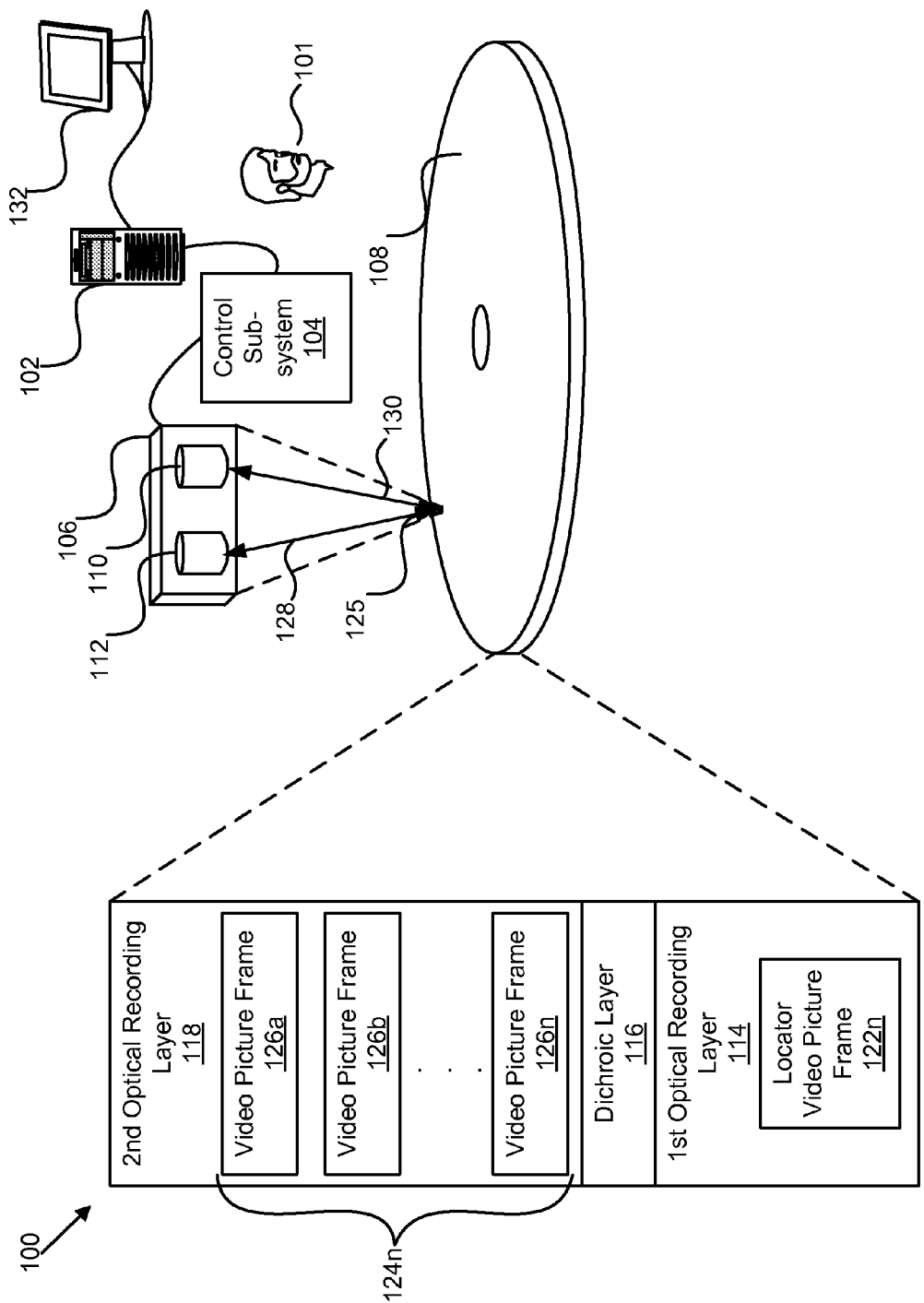
FIG. 1 is a schematic diagram illustrating one embodiment of a system for locating a group of video picture frames in a volume, optical disk, in accordance with the present invention.

FIG. 1 depicts a system 100 for locating a group of video picture frames in a volume, optical storage disk, in accordance with the present invention. The system 100 includes a computer 102, a control sub-system 104, an optical disk reading sled 106, a volume, optical storage-disk 108, a first laser 110, a second laser 112, and a display 114. Those of skill in the art will recognize that the system 100 may be more simple or complex than illustrated so long as the system 100 includes elements or sub-systems that correspond to those described herein.

The volume, optical storage-disk 108 is comprised of multiple layers. From top to bottom, those layers include a first optical recording layer 114, a dichroic layer 116, and a second optical recording layer 118. After their contents are enumerated, each of these layers will be described in greater detail below. The first optical recording layer includes at least one locator video picture frame 122. The second optical recording layer 114 includes at least one group of video picture frames 120 comprising a series of individual video picture frames 122a-122n.

Typically, the computer 102 comprises one or more central processing units (not shown) executing software (not shown) and/or firmware (not shown) to control and manage the other components within the system 100. For example, in certain embodiments, the computer 102 directs the control sub-system 104, which varies the speed and position of the optical disk reading sled 106 relative to the volume, optical-storage disk 108. Usually, such direction from the computer 102 implements instructions from a user 101.

As the optical disk reading sled 106 changes its position relative to the volume, optical-storage disk 108, a first laser 110, and a second laser 112 are directed at the volume, optical-storage disk 108 along tracks (not shown) in the volume, optical-storage disk 108 to read digital information. As discussed, the volume, optical-storage disk 108 comprises multiple layers.

The second layer of the volume optical-storage disk 108 is the second optical recording layer 118. The second optical recording layer 118 is made up of a medium capable of storing digital information in the volume of the medium and is, therefore, the layer that gives the volume, optical-storage disk 108 its name. The second optical recording layer 118 contains at least one group of video picture frames 124. However, embodiments preferably contain several groups of video picture frames 124a-n.

A group of video picture frames 124 is stored in the second optical recording layer 118 in a distinct region 125 of the volume, optical-storage disk 108. The distinct region 125 can be thought of in terms of a cylindrical coordinate system, the origin of which exists at the center of the volume, optical-storage disk 108. Each distinct region 125 of the volume, optical-storage disk 108 is defined by an inner radius $\rho_1$, an outer radius $\rho_2$, a first azimuthal angle $\phi_1$ and a second azimuthal angle $\phi_1$. The height, or 'z' coordinate, within the cylindrical coordinate system is not relevant to the distinct region 125, which is only defined in two dimensions.

A group of video picture frames 124a-n contains several individual video picture frames 126a-126n. Since the second optical recording layer 118 is made up of a medium capable of storing digital information in the volume of the medium, the individual video picture frames 126a-126n of the group of video picture frames 124a-n are capable of being stored, literally, on top of one another, allowing a large number of individual video picture frames 126a-126n frames to occupy the same region of the volume, optical-storage disk 108 that could only store one video picture frame 126 in optical storage disks capable of encoding video picture frames 126a-126n only on their surface.

The second laser 112 sends a second laser beam 128 into the second optical recording layer 118 interacting with each individual video picture frame 126n in the group of video picture frames 124. After completely penetrating the second optical recording layer 118, the second laser beam 128 of the second laser 112 is reflected back to the second laser 112 by the dichroic layer 116. The second laser 112 receives a signal from each individual video picture frame 126n in the group of video picture frames 124. The use of laser light to receive signals from digital information in a volume, optical-storage disk 108 involves developing, but well known, techniques to persons of ordinary skill in the art of volume, optical data-storage.

The dichroic layer 116 reflects a second laser beam 128 from the second laser 112, but allows a first laser beam 130 from the first laser 110 to pass through to the first optical recording layer 114. The first optical recording layer 114 comprises an optical recording medium. In certain embodiments, this optical recording medium comprises one of many widely known technologies for storing digital information on the surface of a recording medium.

The first optical recording layer 114 contains a locator video picture frame 122n corresponding to each group of video picture frames 124a-124n. Each locator video picture frame 126n is stored within substantially the same distinct region 125 as its corresponding group of video picture frames 124n. Although each locator video picture frame 122n is stored within substantially the same distinct region 125 as its corresponding group of video picture frames 124n, each locator video picture frame 122n is stored below its corresponding group of video picture frames 124n.

Each locator video picture frame 122n is substantially similar to an individual video picture frame 126n from the corresponding group of video picture frames 124n. The remaining video picture frames 126k-l from the corresponding group of video picture frames 124n are, in turn, related to the substantially similar individual video picture frame 126n. Therefore, the locator video picture frame 122n describes the contents of group of video picture frames 124n and can be used to locate that group of video picture frames 124n.

The first laser beam 130 from the first laser 110 passes through the dichroic layer 116 and penetrates through the first optical recording layer 114, interacting with each locator video picture frame 122n. After completely penetrating the first optical recording layer 114, the first laser beam 130 from the first laser 110 is reflected back to the first laser 110. The first laser 110 then receives a signal (not shown) from each locator video picture frame 122n. The use of laser light to receive signals from digital information in optical-storage disks involves technologies that are well known to persons of ordinary skill in the art of optical data-storage.

The signals from the first laser 110 and the first laser 110 are processed by the computer 102 to render locator video picture frames 122a-122n and video picture frames 126a-126n respectively. These video picture frames are presented to the user 101 on a display 132. The control sub-system, usually in response to input from a user 101, or possibly from a command from the computer 102, is able to select either locator video picture frames 122a-122n from the first optical recording layer 118 or video picture frames 126a-126n from the second optical recording layer 118 for presentation by the display.

With the aid of the system 100, a user 101 may quickly preview video, as a user might with standard DVD technology. Once the desired locator video picture frame 122n is selected, the user 101 may then access the corresponding group of video picture frames 124n with the aid of the control sub-system 104, which selects video pictures for presentation on the display 132 from the second optical recording layer 118 beginning with the corresponding group of video picture frames 124n.

Figure 2:
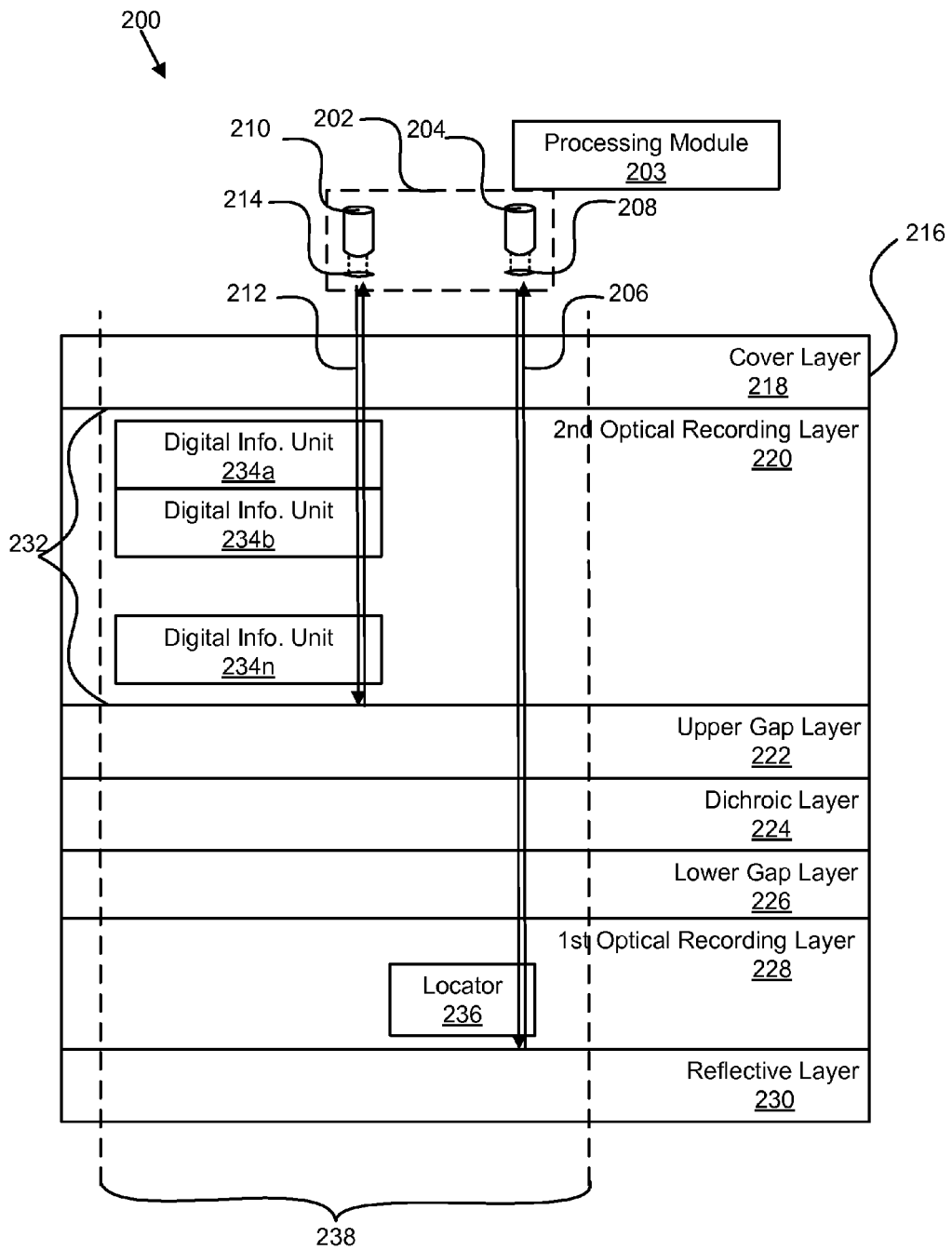
FIG. 2 is a schematic diagram illustrating one embodiment of an apparatus for locating a group of units of digital information configured to read a removable optical disk with two layers, in accordance with the present invention.

FIG. 2 is a schematic diagram illustrating one embodiment of an apparatus 200 for locating a group of units of digital information configured to read a removable optical disk with two layers, in accordance with the present invention. The apparatus 200 includes a receiving tray (not shown) an optical disk reading sled 202 and a processing module 203. The optical disk reading sled 202 includes a first laser 204 that directs a first laser beam 206 with a first focusing lens 208 and a second laser 210 that directs a second laser beam 212 with a second focusing lens 214.

The receiving tray (not shown) is configured to house a removable optical disk 216. The receiving tray is configured to house a removable optical disk 216 that includes a cover layer 218, a first optical recording layer 228, an upper gap layer 222, a dichroic layer 224, a lower gap layer 226, a second optical recording layer 220, and a reflective layer 230. In certain embodiments, the receiving tray spins the removable optical disk 216 at varying rates.

In certain embodiments, the optical disk reading sled 202 seeks in a radial direction across the removable optical disk 216 at a varying radius with respect to the center of the removable optical disk 216. As the optical disk reading sled 202 seeks across the removable optical disk 216, the first laser 204 emits the first laser beam 206 in a direction normal to the plane of the removable optical disk 216. The first laser beam 206 passes through the cover layer 218, the second optical recording layer 220, the upper gap layer 222, the dichroic layer 224, the lower gap layer 226, and the second optical recording layer 220. The first laser beam 206 is focused by a first focusing lens 208 to read the first optical recording layer 228. The first laser beam 206 reads the locator 236 in the first optical recording layer 228 and is reflected by the reflection layer 230 back to the first laser 204.

Simultaneously, a second laser 210 emits a second laser beam 212 that passes through the cover layer 218 and the second optical recording layer 220, but is reflected by the dichroic layer 224. A second focusing lens 214 focuses the second laser beam 212 to read each individual unit of digital information 234 in a group of units of digital information 232 in the second optical recording layer 220.

The locator 236 contains information necessary to determine something about the nature of the contents of each individual unit of digital information 234a-234n in a group of units of digital information 232 stored in the same particular region 238 of the removable optical disk 216 as the first locator 236. In certain embodiments, the locator 236 may be a header that defines entries in a log record, where each entry is a unit of digital information 234 in a group of units of digital information 232. In other embodiments, the locator 236 may be a video picture frame that is substantially similar to a video picture frame stored in the group of units of digital information 232. Several other types of locators 236, corresponding to different types of units of digital information 234 will be readily apparent to a person of ordinary skill in the art.

The processing module 203 receives information read by the first laser 204 and the second laser 210 and processes the information. In certain embodiments, the processing module 203 processes the information into video picture frames (not shown). In certain embodiments, the video picture frames comprise I-frames (not shown), P-frames (not shown), and B-frames (not shown).

The first laser 204 and the second laser 210 are configured to read through the cover layer 218. The cover layer 218 provides a protective coating for the removable optical disk 216. In certain embodiments, the cover layer 218 comprises an ultra-violet-curable, resinous material that protects the removable optical disk 216 against ultraviolet light, dust, and other hazards. Several other types of cover layers 218 may be apparent to one of ordinary skill in the relevant art in light of this disclosure.

The second laser 210, together with the second lens 214 is configured to read information in the second optical recording layer 220. The second optical recording layer 220 is a medium capable of storing data within the three dimensions of its volume. In certain embodiments, the second optical recording layer 220 comprises a holographic recording medium. In other embodiments, the second optical recording layer 220 comprises a three-dimensional optical recording layer. Other embodiments may be apparent to one of ordinary skill in the relevant art in light of this disclosure.

The first laser 204 and 210 are configured to read through the upper gap layer 222 and the lower gap layer 226. The upper gap layer 222 and the lower gap layer 226 provide a layer of separation between the second optical recording layer 220 and the dichroic layer 224 and the dichroic layer 224 and the first optical recording layer 228, respectively. In certain embodiments, the upper gap layer 222 and the lower gap layer 226 may comprise the same material as the cover layer 218. Other embodiments may be apparent to one of ordinary skill in the relevant art in light of this disclosure.

The dichroic layer 224 allows the first laser beam 206 to pass through, while reflecting the second laser beam 212 back to the second laser 210. In several embodiments, the first laser beam 206 is allowed to pass and the second laser beam 212 is reflected based on the differing wavelengths of the first laser beam 206 and the second laser beam 212. In certain embodiments, the dichroic layer 224 includes a dichroic mirror layer. In other embodiments, the dichroic layer 224 includes a dichroic filter layer. In additional embodiments, the dichroic layer 224 includes a dichroic reflector layer. Additional embodiments may be apparent to one of ordinary skill in the relevant art in light of this disclosure.

The first laser 204, together with the first lens 208, is configured to read information in the first optical recording layer 228. The first optical recording layer 228 may comprise a volume, optical storage disk in certain embodiments. Preferably, however, the first optical recording layer 228 comprises an optical storage disk format that only stores data on its surface, such as a CD-ROM, CD-WORM, CD-I, DVI, CD-EMO, OD3, ODD, Video Disk, IVD, BLU-RAY®, HD-DVD, DVD, DVD-R, DVD-Video, DVD-RAM, DVD-Audio, DVD-RAM, DVD-RW, DVD+RW, DVD+R, DVD-Video, and UDO. Additional formats will be readily apparent to one of ordinary skill in the relevant art in light of this disclosure. The reflective layer 230, in certain embodiments, comprises a metallic film. In certain embodiments, the reflective layer 230 is part of the optical storage disk format of the first optical recording layer 228. Other embodiments are possible and will be readily apparent to one of ordinary skill in the relevant art in light of this disclosure.

Figure 3:
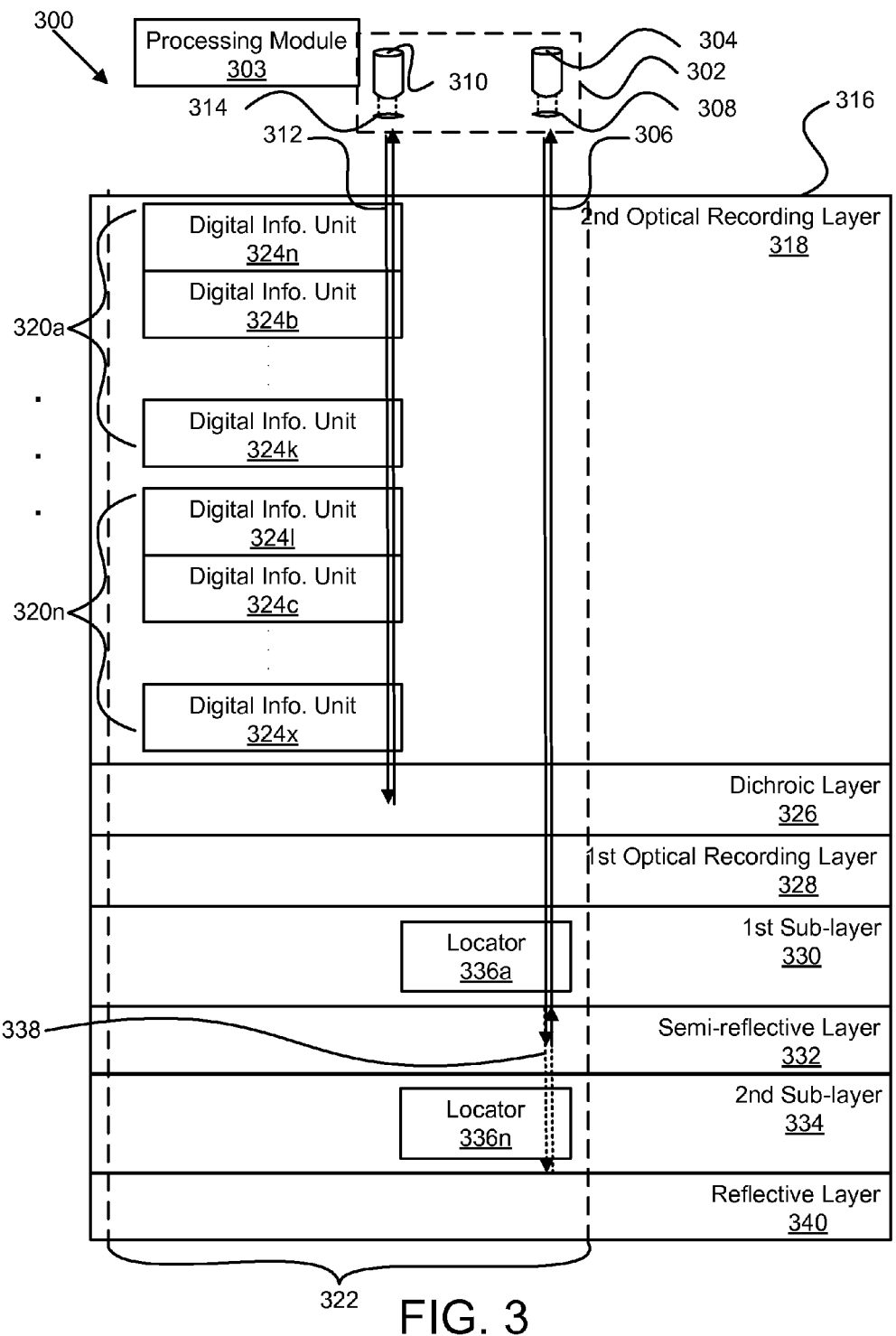
FIG. 3 is a schematic diagram illustrating one embodiment of an apparatus for locating a group of units of digital information configured to read a removable optical disk with two layers and with multiple sub-layers in the second layer, in accordance with the present invention.

FIG. 3 depicts one embodiment of an apparatus 300 for locating a group of units of digital information configured to read a removable optical disk with two layers and multiple sub-layers in the second layer, in accordance with the present invention. The apparatus 300 includes a receiving tray (not shown), optical disk reading sled 302, and a processing module 303. The optical disk reading sled 302 includes a first laser 304 that directs a first laser beam 306 with a first focusing lens 308 and a second laser 310 that directs a laser beam 312 with a second focusing lens 314. The components of the optical disk reading sled 302 are substantially similar to those disclosed above with respect to the optical disk reading sled 202 of FIG. 2.

The first laser 302 and the second laser 310 are configured to read information from a removable optical disk 316 placed in the receiving tray (not shown). The removable optical disk 316 includes a second optical recording layer 318 that is substantially similar to the second optical recording layer 220 disclosed above in reference to FIG. 2. However, the second optical recording layer 318 of FIG. 3 contains multiple groups of units of digital information 320a-320n in the same region 322 of the optical disk 316. Each group of units of digital information 320a-320n and the individual units of digital information 324n-k, 324l-324x, of which they are comprised, are substantially similar to the group of units of digital information 232 and the individual units of digital information 234a-n of FIG. 2.

The optical storage disk 316 also includes a dichroic layer 326 below the first optical recording layer 318 that is substantially similar to the dichroic layer 224 of FIG. 2. Below the dichroic layer 326, the optical storage disk 316 includes a first optical recording layer 328 substantially similar to the first optical recording layer 228 of FIG. 2, except that the first optical recording layer 328 of FIG. 3 includes a first sub-layer 330, a semi-reflective layer 332, and a second sub-layer 334. The first laser 304, together with the first lens 308, is configured to read information from both the first sub-layer 330 and the second sub-layer 334.

The first sub-layer 330 and the second sub-layer 334 each include a locator 336a, 336n on their surface in a particular region 322 of the removable optical disk 316 that includes the groups of units of digital information 320a-320n. In certain embodiments, the first optical recording layer 328 includes more than two sub-layers, each sub-layer including its own locator 336x on its surface, each of these locators 336x are also in the particular region 322 of the removable optical disk 316 as the groups of units of digital information 320a-320n. In certain embodiments, where the first optical recording layer 328 comprises a medium capable of storing digital information in its volume, several locators 336a-336n may be stored in the particular region 332 that includes the groups of units of digital information 320a-320n.

Each locator 336x corresponds to a particular group of units of digital information 320. Each locator 336x defines, describes, or provides context for the contents of each individual unit of digital information 324 within its corresponding group of units of digital information 320, as described above, with respect to the locator 236 and the group of units of digital information 232 depicted in FIG. 2.

The surface of the first sub-layer 330 and the surface of the second sub-layer 334 allow multiple locators 336a-336n to be stored in the same region 332 of the optical disk 316. Therefore, these multiple locators 336a-336n may be used to locate multiple groups of units of digital information 320a-320n that are stored in the particular region 332 of the second optical recording layer 318. Therefore, the sub-layers 330, 334 of the first optical recording layer 328 allow multiple groups of units of digital information 320a-320n to be located quickly.

The first laser 304 is configured to be effected by the semi-reflective layer 332. The semi-reflective layer 332 comprises a semi-transparent, metallic foil that reflects much of the first laser beam 306 back to the first laser 304 and allows a portion of the first laser beam 338 to pass through to the second sub-layer 334 and read the locator 336n in the second sub-layer 334. After reading the locator 336n in the second sub-layer 334, the portion of the laser beam 338 is reflected back to the first laser 304 by the reflective layer 340, which is substantially similar to the reflective layer 230 in FIG. 2.

The processing module 303 receives information read by the first laser 304 and the second laser 310 and processes the information. In certain embodiments, the processing module 303 processes the information into video picture frames (not shown). In certain embodiments, the video picture frames comprise I-frames (not shown), P-frames (not shown), and B-frames (not shown).

Figure 4:
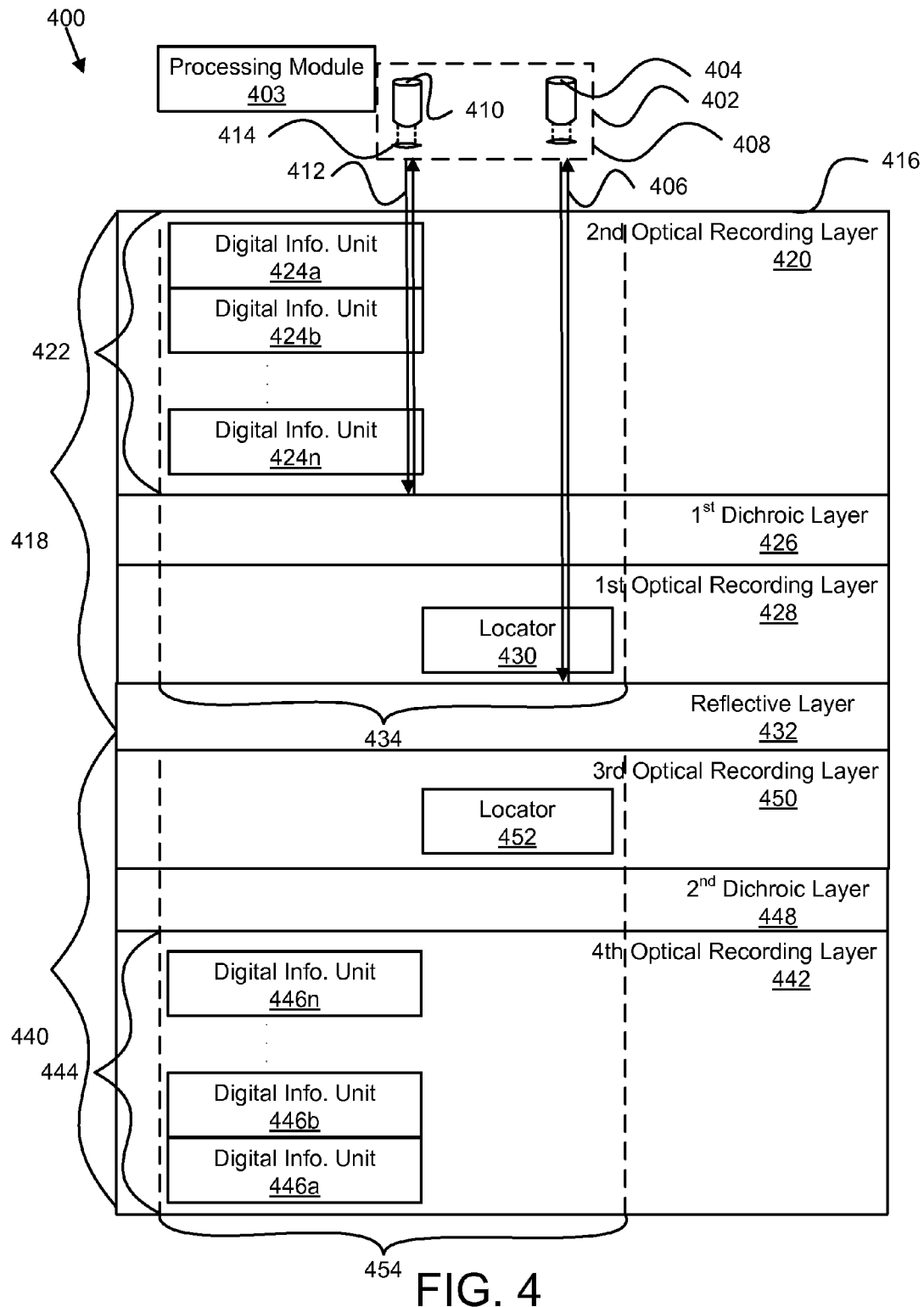
FIG. 4 is a schematic diagram illustrating one embodiment of an apparatus for locating a group of units of digital information configured to read a removable optical disk with two layers on the front and back sides of the optical disk, in accordance with the present invention.

FIG. 4 depicts an apparatus 400 for locating a group of units of digital information employing an optical disk with two layers on the front and back sides of the optical disk, in accordance with the present invention. The apparatus 400 includes a receiving tray (not shown), an optical disk reading sled 402, and a processing module 403. The optical disk reading sled 402 includes a first laser 404 that directs a first laser beam 406 with a first focusing lens 408 and a second laser 410 that directs a laser beam 412 with a second focusing lens 414. The components of the optical disk reading sled 402 are substantially similar to those disclosed above with respect to the optical disk reading sled 202 of FIG. 2.

The first laser 404 and the second laser 410 are configured to read information from a removable optical disk 416. The removable optical disk 416 includes a first side 418 and a second side 440. The first side 418 includes a second optical recording layer 420 that is substantially similar to the second optical recording layer 220 disclosed above in reference to FIG. 2. The second optical recording layer 420 includes a first group of units of digital information 422 comprised of multiple individual units of digital information 424a-424n that are substantially similar to the 232 group of units of digital information comprised of multiple individual units of digital information 234a-23, as discussed above with respect to FIG. 2.

The first side 418 also includes a first dichroic layer 426 below the first optical recording layer 418 that is substantially similar to the dichroic layer 224 of FIG. 2 and a second optical recording layer 428 that is substantially similar to the second optical recording layer 228 of FIG. 2. The second optical recording layer 428 includes a first locator 430 that is substantially similar to the locator 236 described with respect to FIG. 2. The first side 418 also includes a reflective layer 432 that is substantially similar to the reflective layer 230 of FIG. 2.

The first locator 430 is located in the same region 434 of the first side 418 of the optical storage disk 416 as the first group of units of digital information 422. Therefore, the first locator 430 can be used to locate the first group of units of digital information 422 as discussed above with respect to FIGS. 3 and 4.

The second side 440 of the optical storage disk 416 includes a fourth optical recording layer 442 that is substantially similar to the second optical recording layer 420 of the first side 418 of the optical-storage disk 416. In addition, the fourth optical recording layer 442 includes a second group of units of digital information 444 comprised of individual units of digital information 446a-446n substantially similar to the first group of units of digital information 422 comprised of individual units of digital information 424a-424n of the first side 418. The second side 440 also includes a second dichroic layer 448 substantially similar to the first dichroic layer 426 of the first side 418.

The second side 440 also includes a third optical recording layer 450 that is substantially similar to the first optical recording layer 428 of the first side 418. The third optical recording layer includes a second locator 452 that is substantially similar to the first locator 430 in the first optical recording layer 428 of the first side 418. The second side 440 also includes the reflective layer 432.

The second locator 452 is located in the same region 454 of the second side 440 of the optical storage disk 416 as the second group of units of digital information 444. Therefore, the second locator 454 can be used to locate the second group of units of digital information 444, as discussed above, with respect to FIGS. 3 and 4.

Therefore, the first side 418 and the second side 440 are mirror images of one another. The optical disk reading sled 402 can only read one side at a time. However, the optical storage disk 416 is able to store twice as much information.

The processing module 403 receives information read by the first laser 404 and the second laser 410 and processes the information. In certain embodiments, the processing module 403 processes the information into video picture frames (not shown). In certain embodiments, the video picture frames comprise I-frames (not shown), P-frames (not shown), and B-frames (not shown).

Figure 5:
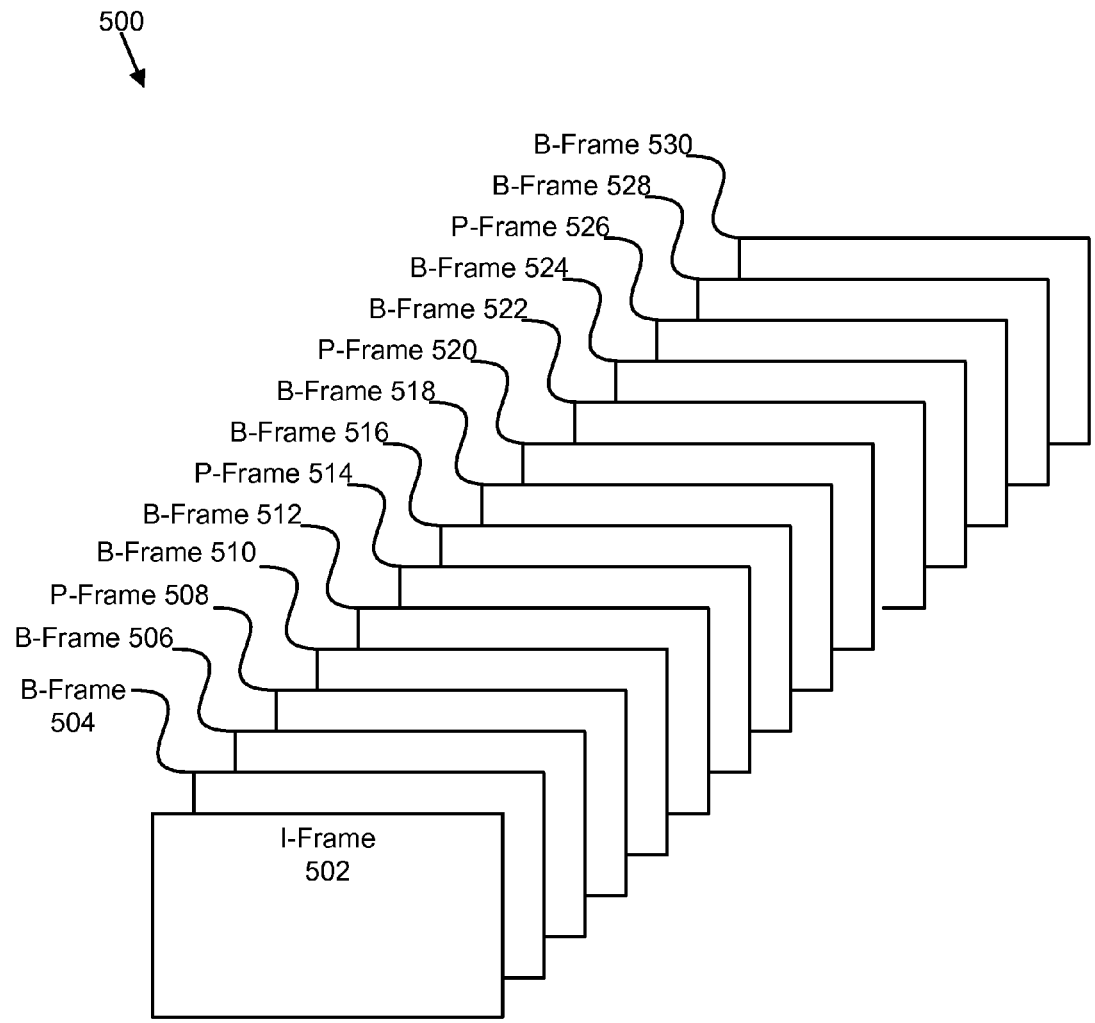
FIG. 5 is a schematic diagram illustrating one embodiment of a group of video picture frames read by one embodiment of the present invention.

FIG. 5 depicts a group of video picture frames 500, in accordance with one embodiment of the present invention. The group of video picture frames 500 is consistent with the Motion Picture Experts Group (MPEG) format. MPEG is a video format that uses the I Frame 502, B-Frames 504, 506, 510, 512, 516, 518, 522, 524, 528, 530, and P-Frames 508, 514, 520, 526 of the group of video picture frames 500 to compress video data. The group of video picture frames 500 comprises 15 frames. The MPEG format, in a single second, typically displays two groups of video picture frames 500, for a total of 30 video picture frames.

The I-Frame 502, also known as the "anchor" or "keyframe," is a video picture frame that contains the complete content of a video picture frame. I-Frames 502 are the Frames displayed when a user fast-forwards or rewinds a DVD. P-Frames 508, 514, 520, 526 and B-Frames 504, 506, 510, 512, 516, 518, 522, 524, 528, 530 rely on the I-Frame.

P-Frames 508, 514, 520, 526, also known as "deltaframes," only contain information about changes with respect to the I-Frame 502, in terms of content and color. Therefore, a P-Frame 508, 514, 520, 526 cannot be displayed without its corresponding I-Frame. However, by only carrying data about what has changed with respect to the I-Frame 502, P-Frames 508, 514, 520, 526 require less storage space, allowing the video Data to be compressed.

The B-Frames 504, 506, 510, 512, 516, 518, 522, 524, 528, 530, also referred to as "delta frames," allow for further compression, by containing only information about changes with respect to both previous and subsequent frames in terms of content or color. Therefore, B-Frames 504, 506, 510, 512, 516, 518, 522, 524, 528, 530 also require I-Frames 502 to be displayed.

The group of video picture frames 500 of FIG. 5, includes a single I-Frame 502 followed by two B-Frames 504, 506. Next, a P-Frame 508 follows, followed, in turn, by two more B-Frames. A second P-Frame 514 follows with two more B-Frames 516, 518 behind it. Next, a third P-Frame 520 follows, with two additional B-Frames 522, 524 behind. A fourth P-Frame 526 follows, again with two additional B-Frames 528, 530 behind. The total group of video picture frames 500, therefore, includes 15 frames. This is a typical pattern and grouping for MPEG format.

In several embodiments of FIG. 1, the group of video picture frames 120 of FIG. 1 is made up of the group of video picture frames 500 of FIG. 5 and the locator video picture frame 126 consists of the I-Frame 502 of FIG. 5. Similarly, in several embodiments of FIGS. 2-4, the various groups of units of digital information 232, 320*a-n*, 422, 444 are made up of the group of video picture frames 500 of FIG. 5, and the various locators 236, 336*a*, 336*n*, 430, 452 consist of the I-Frame 502 of FIG. 5.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
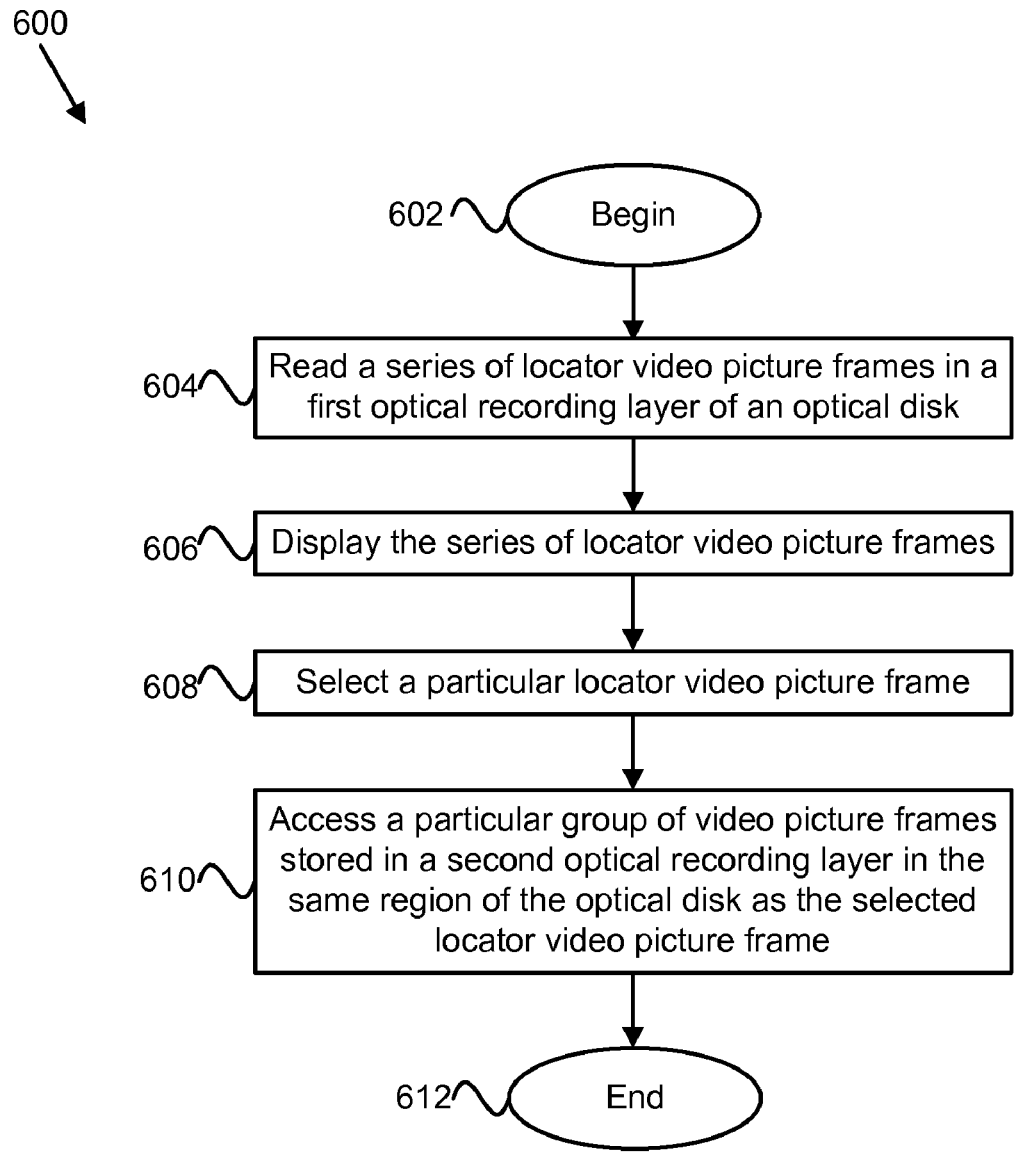
FIG. 6 is a schematic flow chart diagram illustrating one embodiment of a method for locating a group of video picture frames, in accordance with the present invention.

FIG. 6 is a schematic flow chart diagram illustrating one embodiment of a method 600 for locating a group of video picture frames, in accordance with the present invention. The method begins 602 and an optical disk reading sled 106 reads 604 a series of locator video picture frames 126 in the first optical recording layer 118 of an optical-storage disk 108. A display 132 displays 606 the series of locator video picture frames 126. A user 101 selects 608 a particular locator video picture frame 126 from the series of displayed locator video picture frames. A control sub-system 104 then accesses 610 a particular group of video picture frames 120 stored in the a second optical recording layer in the same region 125 of the optical-storage disk 118 as the selected locator video picture frame 126, and the method 600 ends 612.

Figure 7:
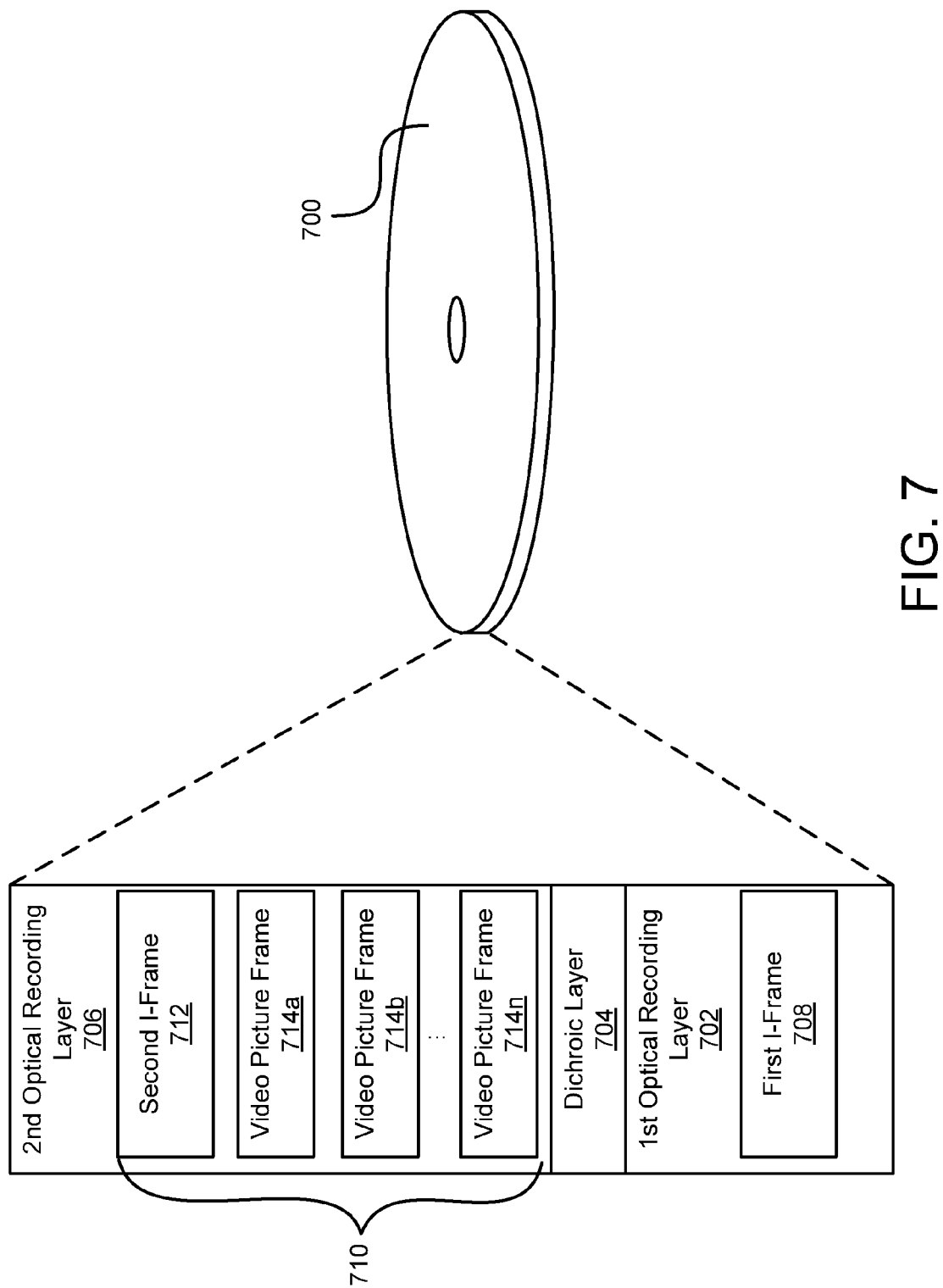
FIG. 7 is a schematic diagram illustrating one embodiment of a system for locating a group of video picture frames in a volume, optical disk, in accordance with the present invention.

FIG. 7 depicts an optical storage-disk 700. The optical storage-disk 700 is comprised of multiple layers. From top to bottom, those layers include a first optical recording layer 702, a dichroic layer 704, and a second optical recording layer 706. The first optical recording layer 702 includes a locator video picture frame comprising a first I-Frame 708. The second optical recording layer 706 includes at least one group of video picture frames 710 comprising a series of individual video picture frames 712, 714*a*-714*n* including a second I-Frame 712. In one embodiment, the first I-Frame 708 is a duplicate of the second I-Frame 712.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to locate a group of units of digital information in a removable optical disk, the apparatus comprising:
   a receiving tray configured to house a removable optical disk;
   a first laser configured to read information from a first locator video picture frame stored in a first optical recording layer of the removable optical disk at a particular region of the removable optical disk, the first locator video picture frame comprising a first I-Frame;
   a second laser configured to read units of digital information in a first group of units of digital information stored throughout a volume of a second optical recording layer of the removable optical disk at the particular region in which the first locator video picture frame is stored, the first group of units of digital information locatable by the first locator video picture frame and comprising a first group of video picture frames comprising a second I-Frame, the first I-Frame being a duplicate of the second I-Frame from the first group of video picture frames;
   a processing module coupled to the first laser and to the second laser that processes the information read by the first laser and by the second laser; and
   an optical disk reading sled that carries the first laser and the second laser and seeks in a radial direction across the removable optical disk at a varying radius with respect to the removable optical disk when housed in the receiving tray.

2. The apparatus of claim 1, wherein the first laser is configured to read through a dichroic layer disposed between the first optical recording layer and the second optical recording layer in the removable optical disk and the second laser is configured not to read through the dichroic layer, the dichroic layer selected from one of the group of a dichroic minor layer, a dichroic filter layer, and a dichroic reflector layer.

3. The apparatus of claim 1, wherein the first group of video picture frames comprises at least one of a group consisting of a P-Frame and a B-Frame.

4. The apparatus of claim 2, wherein the second laser is configured to read the first group of units of digital information from the second optical recording layer of the removable optical disk, wherein the second optical recording layer is comprised of one of a holographic recording layer and a three-dimensional optical recording layer.

5. The apparatus of claim 2, wherein the first laser is configured to read the first locator video picture frame from the first optical recording layer of the removable optical disk, the first recording layer of the removable optical disk being selected from one of the following optical medium formats: Read Only Memory (ROM), Write Once, Read Many (WORM), Interactive (I), Erasable (E), CD-ROM, CD-WORM, CD-I, DVI, CD-EMO, OD3, ODD, Video Disk, IVD, BLU-RAY®, HD-DVD, DVD, DVD-R, DVD-Video, DVD-RAM, DVD-Audio, DVD-RAM, DVD-RW, DVD+RW, DVD+R, DVD-Video, and UDO.

6. The apparatus of claim 2, wherein the first laser is configured to read a plurality of sub-layers in the first optical recording layer of the removable optical disk, each sub-layer storing a locator video picture frame substantially similar to a video picture frame from a group of video picture frames corresponding to the locator frame in question, where the corresponding group of video picture frames is stored in a substantially similar region of the removable optical disk as the region in which the locator video frame in question is stored.

7. The apparatus of claim 2, wherein the receiving tray is configured to house the removable optical disk that has a first optical recording layer and a second optical recording layer on both sides of the removable optical disk, wherein the first laser is configured to read a first locator from the first optical recording layer on both sides of the removable optical disk, and wherein the second laser is configured to read a first group of units of digital information in the second optical recording layer on both sides of the removable optical disk.

8. The apparatus of claim 2, wherein the first laser is configured to read the first locator video picture frame and the second laser is configured to read the first group of units of digital through a cover layer above the second optical recording layer.

9. The apparatus of claim 2, wherein the second laser is configured to read the first group of units of digital information through one or more of an upper gap layer between the second optical recording layer and the dichroic layer and a lower gap layer between the dichroic layer and the first optical recording layer.

10. The apparatus of claim 1, wherein the particular region is defined in two-dimensions across a surface of the removable optical recording disk.

11. A system to locate a group of video picture frames in a removable optical disk, the system comprising:
a first laser configured to read signals from a first locator video picture frame substantially similar to a video picture frame from a first group of video picture frames stored throughout a volume of a second optical recording layer in a distinct region of an optical disk, wherein the first locator video picture frame is stored on a surface of a first optical recording layer in substantially a same distinct region of the optical disk as the distinct region storing the first group of video picture frames, the first locator video picture frame providing context for the first group of video picture frames, the first locator video picture frame comprising a first I-Frame, the first locator video picture frame stored in the first optical recording layer, wherein the first laser is directed toward the optical disk and disposed in an optical disk reading sled that rotates around the optical disk at a varying radius with respect to the center of the optical disk, wherein each group of video picture frames comprises a second I-Frame and at least one of a group consisting of a P-Frame and a B-Frame, and wherein the first I-Frame is a duplicate of the second I-frame;
a second laser configured to read signals from the first group of video picture frames stored in the second optical recording layer, wherein the second laser is directed toward the optical disk and disposed in the optical disk reading sled adjacent to the first laser;
a computer configured to process signals from both the first laser and the second laser to render video picture frames; and
a control sub-system configured to vary the speed with which the optical reading sled changes position relative to the optical disk and configured to select between video picture frames from the first optical recording layer and from the second optical recording layer for display.

12. The system of claim 11, wherein the second recording layer is selected from one of a holographic recording layer and a three-dimensional optical recording layer.

13. The system of claim 11, wherein the first recording layer is selected from one of the following optical medium formats: Read Only Memory (ROM), Write Once, Read Many (WORM), Interactive (I), Erasable (E), CD-ROM, CD-WORM, CD-I, DVI, CD-EMO, OD3, ODD, Video Disk, IVD, BLU-RAY®, HD-DVD, DVD, DVD-R, DVD-Video, DVD-RAM, DVD-Audio, DVD-RAM, DVD-RW, DVD+RW, DVD+R, DVD-Video, and UDO.

14. The system of claim 11, wherein the first recording layer has a plurality of sub-layers, each sub-layer storing a locator video picture frame substantially similar to a video picture frame from a group of video picture frames corresponding to the locator frame in question, where the corresponding group of video picture frames is stored in a substantially similar region of the optical disk as the region in which the locator video frame in question is stored.

15. The system of claim 11, wherein the optical disk has a first optical recording layer and a second optical recording layer on both sides of the optical disk.

16. The system of claim 11, further comprising a cover layer above the second optical recording layer.

17. The system of claim 11, wherein the optical disk has a dichroic layer selected from one of the group of a dichroic minor layer, a dichroic filter layer, and a dichroic reflector layer, wherein the dichroic layer is disposed between the first optical recording layer and the second optical recording layer and allows light from the first laser to pass through to the first optical recording layer, but reflects light from the second laser, the optical disk further comprising an upper gap layer between the second optical recording layer and the dichroic layer and a lower gap layer between the diachronic mirror layer and the first optical recording layer.

18. A method for locating a group of video picture frames in an optical disk, the method comprising:
reading a series of locator video picture frames from a first optical recording layer of an optical disk, wherein each locator video picture frame is stored on a surface of the first optical recording layer in a distinct region of the optical disk, the first optical recording layer comprising an optical storage medium storing digital information on the surface of the first optical recording layer;
displaying the series of locator video picture frames;
selecting a particular locator video picture frame by a user from the series of displayed locator video picture frames, the particular locator video picture frame comprising a first I-Frame; and
accessing a particular group of video picture frames stored throughout a volume of a second optical recording layer in the distinct region of the optical disk in which the particular video picture frame is stored, the distinct region defined in two dimensions across a surface of the optical disk, the first locator video picture frame describing a context of the particular group of video picture frames, the particular locator video picture frame being substantially similar to a video picture frame in the particular group of video picture frames, the second optical recording layer comprising a volume optical storage medium storing digital information within the volume of the second optical recording layer, the particular group of video picture frames comprising a P-Frame, a B-Frame, and a second I-Frame being a duplicate of the first I-Frame.

* * * * *